United States Patent [19]

Stephan et al.

[11] 4,209,297
[45] Jun. 24, 1980

[54] TRANSFER PRINTING PROCESS

[75] Inventors: Günter Stephan, Bergisch-Gladbach; Hartmut Birmes, Wuppertal; Artur Haus, Overath; Erwin Plaza, Leverkusen, all of Fed. Rep. of Germany

[73] Assignee: Bayer Aktiengesellschaft, Leverkusen, Fed. Rep. of Germany

[21] Appl. No.: 873,020

[22] Filed: Jan. 27, 1978

[30] Foreign Application Priority Data

Feb. 2, 1977 [DE] Fed. Rep. of Germany ....... 2704279

[51] Int. Cl.$^2$ .............................................. D06P 1/19
[52] U.S. Cl. ........................................ 8/467; 106/22; 106/25; 156/230; 260/163; 427/146
[58] Field of Search ............................ 8/2.5 A, 2.5 R; 260/163; 156/230; 427/146

[56] References Cited

U.S. PATENT DOCUMENTS

| 1,600,277 | 9/1926 | Ellis et al. ................................. 8/24 |
| 3,994,250 | 11/1976 | Norris ........................................ 8/2.5 |

FOREIGN PATENT DOCUMENTS

| 1001496 | 8/1965 | United Kingdom ..................... 8/2.5 A |
| 1249350 | 10/1971 | United Kingdom ..................... 8/2.5 A |

OTHER PUBLICATIONS

Color Index, 2nd Edition, 1956, vol. 3, p. 3036.

Primary Examiner—J. Ziegler

Attorney, Agent, or Firm—Sprung, Felfe, Horn, Lynch & Kramer

[57] ABSTRACT

Fabrics of preferably polyester fibres can be printed in deep yellow colors with good fastness properties if dyestuffs of the formula

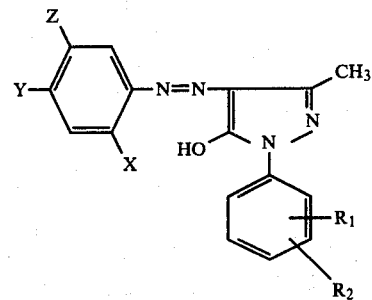

wherein
X denotes hydrogen, chlorine, methyl, nitro, CF$_3$ or cyano,
Y denotes methyl, methoxy, nitro or chlorine or cyano and
Z denotes hydrogen, methyl, chlorine or cyano,
R$_1$/R$_2$ representing hydrogen, chlorine, methyl or methoxy, with the proviso that R$_1$ and/or R$_2$ denote chlorine, methyl or methoxy if X represents a nitro group,
are used according to the transfer printing principle.

3 Claims, No Drawings

TRANSFER PRINTING PROCESS

The present invention relates to a process for printing sheet-like structures consisting of synthetic or partially synthetic polymeric materials in accordance with the transfer printing principle, which is characterised in that dyestuffs of the formula

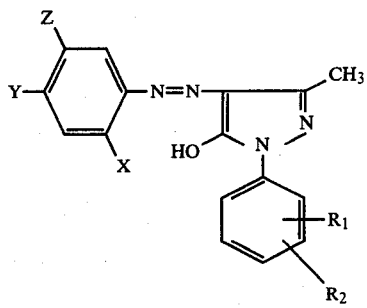

wherein
  X denotes hydrogen, chlorine, methyl, nitro, $CF_3$ or cyano,
  Y denotes methyl, methoxy, nitro or chlorine or cyano and
  Z denotes hydrogen, methyl, chlorine or cyano,
  $R_1/R_2$ representing hydrogen, chlorine, methyl or methoxy, with the proviso that $R_1$ and/or $R_2$ denote chlorine, methyl or methoxy if X represents a nitro group,
are used.

The invention further relates to printing inks or printing pastes for transfer printing, the temporary supports printed or impregnated with dyestuffs of this type and the substrates which have been dyed with dyestuffs of this type in accordance with the transfer printing principle.

The dyestuffs of the formula (I) to be used according to the invention are known or are accessible by customary methods.

However, these dyestuffs have hitherto only been used as pigments or for dyeing benzines, oils and the like.

The transfer printing process is also generally known (compare, for example, Colour Index, 3rd edition, volume 2, page 2,480) and is described in detail, for example, in French Patent Specifications Nos. 1,223,330, 1,334,829 and 1,585,119).

Gravure printing and rotary film printing are particularly suitable printing processes for the preparation of printed paper temporary supports.

Suitable substrates are preferably sheet-like structures, such as non-woven fabrics, felts, furs, films and, above all, woven fabrics consisting of synthetic material, in particular of polyamides and, above all, of aromatic polyesters and cellulose triacetate.

Prints with good fastness properties in use are obtained on these substrates by the process claimed.

EXAMPLE 1

(A) 75 g of the dyestuff of the formula

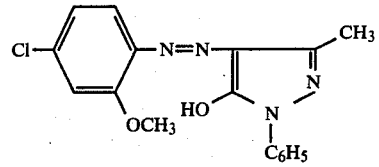

50 g of an anionic dispersing agent, for example a ligninsulphonate or a condensation product of naphthalenesulphonic acid and formaldehyde, and 100 ml of water are mixed and are converted into a finely divided form by grinding for 10 hours in a ball mill.

The dispersion thus obtained, containing about 30% by crude dye, is stable to storage.

(B) The aqueous dispersion obtained in accordance with (A) can be processed as follows to give a printing paste.

50-200 g are mixed into a paste with 400 g of a 10% strength carob bean flour ether thickener and 550-400 ml of water.

(C) A paper is printed with this printing paste by the gravure printing process. If this paper is pressed together with a textile consisting of polyester fibres for 15-60 seconds at 200° C., a strong yellow print, for example, is obtained.

EXAMPLE 2

(A) 50 g of the dyestuff of the formula

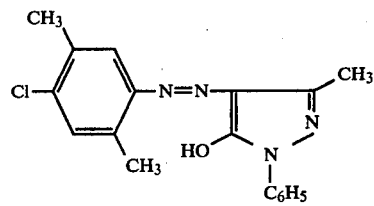

are mixed into a paste with 5-10 g of an emulsifier mixture consisting of ethoxylated nonylphenol (4-12 mols of ethylene oxide) in water. 10 g of ethylcellulose N 4 (Hercules Powder) and 30-40 parts of a maleate resin, which has been prepared by condensation of colophonium with maleic acid, are added. The mixture is kneaded at 80°-100° C. for about 2 hours and is then ground on one of the customary mills. A fine-particled dyestuff powder is obtained.

(B) 200 g of the dyestuff powder obtained in accordance with (A) are added to a mixture of 730 g of ethanol, 50 g of ethylene glycol and 20 g ethylcellulose N 22 (Hercules Powder), whilst stirring.

(C) Papers can be printed, by gravure printing, with the printing ink thus obtained. Textiles consisting of, for example, cellulose triacetate, for example, knitted fabrics, can be printed from these printed papers by the transfer process, and strong yellow prints are obtained.

EXAMPLE 3

75 g of the dyestuff of the formula

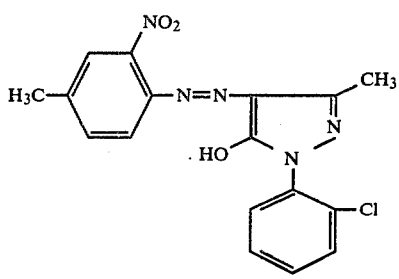

together with 50 g of a condensation product of naphthalenesulphonic acid and formaldehyde and 100 g of water are finely dispersed in a ball mill. The dyestuff dispersion thus obtained is stirred into a thickener which of 21 parts of water, 7 parts of diacetone-alcohol, 41.3 parts of Microdol ® extra (natural calcium magnesium carbonate), 0.2 part of sodium hexametaphosphate, 0.5 part of a naphthalenesulphonic acid/formaldehyde condensation product, 8 parts of 3% strength Bentone ® EW (swellable clay) and 12 parts of Acrylate Binder DA (50% strength solution of the ammonium salt of a polyacrylate in 33% strength aqueous ethyl alcohol. The polyacrylate is a copolymer of 60 of acrylic acid ethyl ester, 25 of methacrylic acid ethyl ester and 15 of acrylic acid).

This printing paste is printed onto a temporary support, preferably paper with a weight per square meter of about 60–80 g/cm² and a Cobb$_{60}$ value of about 80, using screen-printing stencils or rotary stencils. A smooth print is obtained.

Textiles, for example consisting of polyesters, can be printed with the paper thus prepared by bringing the textile into contact with the paper for 15–60 seconds and heating to temperatures of 190°–200° C.

A yellow transfer with good fastness properties in use is obtained. A similar result is achieved if the dyestuff of the formula

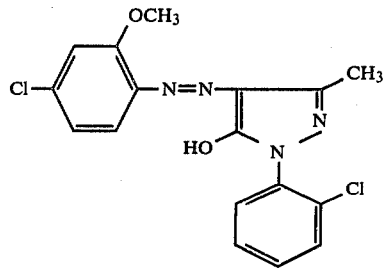

is employed.

We claim:

1. In a transfer printing process for printing sheet-like structures consisting of synthetic or partially synthetic polymeric materials wherein a temporary support is printed or impregnated with a dyestuff which is subsequently transferred to said sheet-like structures, the improvement comprising printing said structures with a dyestuff of the formula

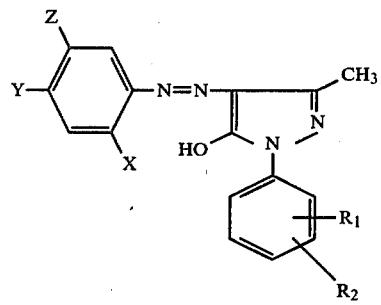

wherein
X is hydrogen, chlorine, methyl, nitro, or CF$_3$;
Y is methyl, methoxy, nitro, or chlorine;
Z is hydrogen, methyl, or chlorine; and
R$_1$ and R$_2$ independently of one another represent hydrogen, chlorine, methyl, or methoxy, with the proviso that at least R$_1$ or R$_2$ is chlorine, methyl, or methoxy if X is nitro.

2. A temporary support for use in the process of claim 1 printed or impregnated with a dyestuff of claim 1.

3. The temporary support of claim 1, wherein the support comprises paper.

* * * * *